Patented May 14, 1940

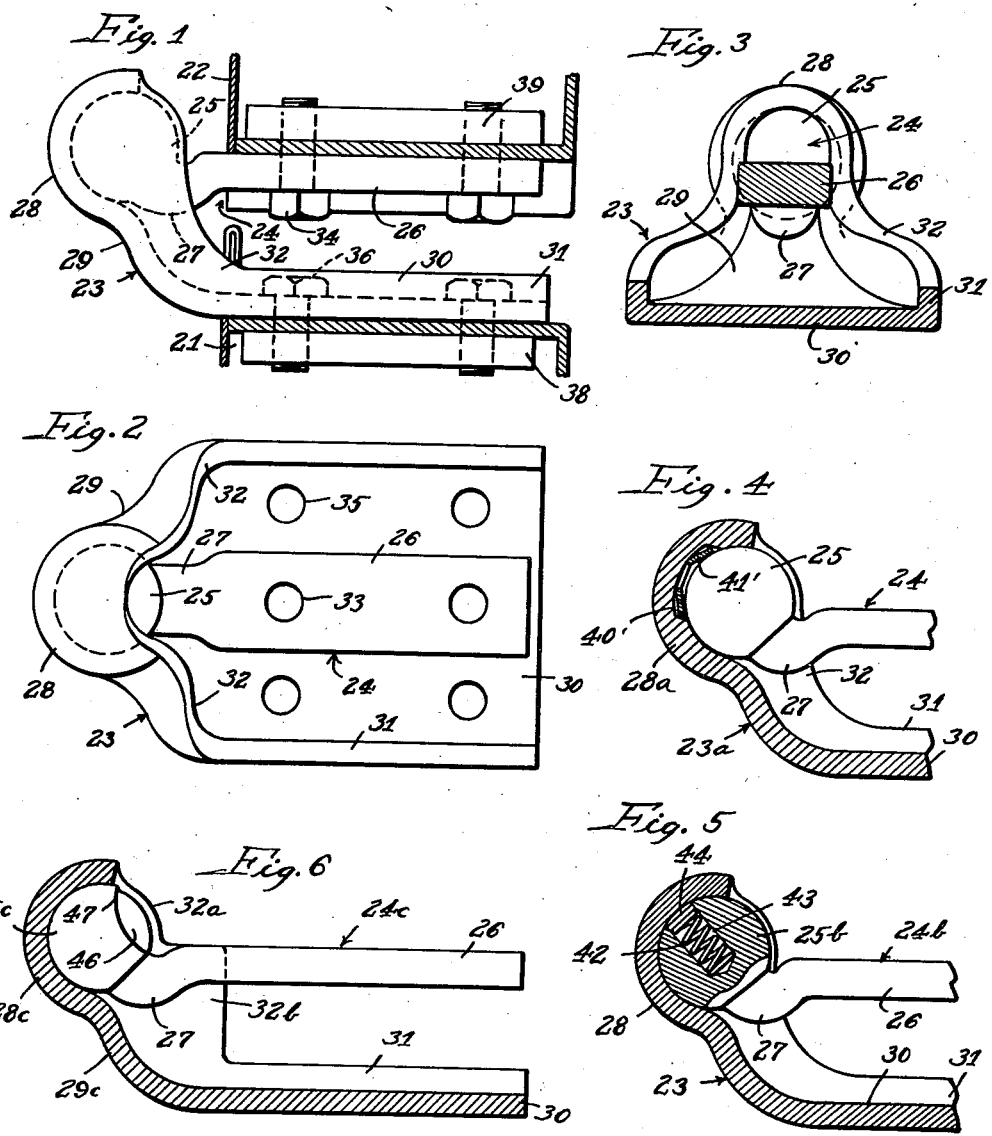
May 14, 1940. S. B. ATWOOD 2,200,440
HINGE
Original Filed March 15, 1937

2,200,440

UNITED STATES PATENT OFFICE 2,200,440

HINGE

Seth B. Atwood, Rockford, Ill.

Original application March 15, 1937, Serial No. 130,864. Divided and this application February 17, 1938, Serial No. 190,923

14 Claims. (Cl. 16—135)

This application is a division of my copending application Serial No. 130,864, filed March 15, 1937.

This invention relates to improvements in hinges, and is particularly concerned with improved ball-and-socket hinges especially designed for the doors of motor vehicles.

In my parent application referred to above, I outlined the advantages flowing from the use of ball-and-socket hinges as compared with the old style pintle hinges, which are, briefly, that the necessity for accurate alignment is eliminated, the door swings freely on the two-point suspension afforded by two ball-and-socket hinges, and since the binding action traceable to pintle misalignment is eliminated, wear is reduced and door rattling due to such wear is no longer experienced.

One of the principal objects of my invention is to provide a ball-and-socket hinge, the socket member of which is formed from one piece of sheet metal to provide an attaching shank portion, angular connecting portion, and a rounded socket portion, the socket member being of channel-shaped cross-section for strength and rigidity.

Another important object of my invention is to provide a ball-and-socket hinge, the ball head member of which is of gooseneck form, thereby offsetting the ball-headed extremity in relation to the attaching shank portion, so that angular adjustment of the gooseneck portion adjusts the ball head in relation to the shank in adapting the hinge to a given door installation.

A still further object is to provide an improved ball-and-socket hinge in which provision is made so that in the closing of the one-piece sheet metal socket member to enclose the ball head, the marginal portions of the socket may be bent inwardly farther than would otherwise be permitted, so as to have the ball head fitting more closely in the finished socket.

The invention is illustrated in the accompanying drawing, in which—

Figs. 1 and 2 are two views of a ball-and-socket hinge made in accordance with my invention;

Fig. 3 is a cross section of the hinge of Fig. 1;

Fig. 4 is a central longitudinal sectional detail of the hinge illustrating a tensioning spring in the socket;

Fig. 5 is a similar section showing spring actuated tensioning means housed in the ball head, and Fig. 6 is a central longitudinal section through a hinge similar to that shown in Figs. 1 and 2, but with a modified form of ball head and modified form of socket member.

Similar reference numerals are applied to corresponding parts throughout the views.

Referring first to Figs. 1 to 3, 21 designates the door, and 22 the pillar, but it will soon be evident that it is immaterial whether the socket member 23 and ball head member 24 of my improved ball-and-socket hinge are mounted on the door and pillar, respectively, or vice versa. The ball head member 24 is formed in one piece to provide a ball head 25 on the end of a flattened attaching shank 26. An offset reduced gooseneck 27 joins the head to the shank and locates the head so that the door can open through approximately 90° without interference between the neck 27 and the socket 28. The latter is formed on the extremity of the angled outer end portion 29 of the socket member 23, which, as shown, is formed from a single piece of sheet metal. The shank 30 has marginal flanges 31 bent outwardly therefrom for reenforcement. These flanges are coextensive with the wider top and bottom walls 32 of the angular outer end 29. In other words, the channeled cross-section is continued throughout up to the socket 28, and the hinge member therefor has the desired strength and rigidity. The angular end 29 tapers from the width of the shank 30 down to the diameter of the socket 28, as clearly appears in Figs. 2 and 3, and this affords the additional width in the walls 32 required in the closing of the socket on the ball head when a blank of substantially uniform width is used. The width of the blank is such that there is sufficient stock to "wrap around" or envelop the ball head 25 through approximately 270°, as clearly appears in Figs. 2 and 3. To begin with, of course, the socket 28 will be only partially completed to a substantially half round or hemispherical form with the opposed walls 32 projecting outwardly from the socket tangent to the ball head, and then the interfitted parts will be placed between dies and the socket portion 28 of the member 23 will be "closed" on the ball head with the right working clearance for smooth and easy operation. The shank 26 of the ball head member 24 has holes 33 through which cap screws 34 are passed to fasten the member to the pillar 22. Holes 35 are provided in the shank 30 to receive cap screws 36 for fastening the socket member 23 to the door 21. Reenforcing anchor plates 38 and 39 are shown in the door 21 and pillar 22, and these are provided with tapped holes to receive the cap screws in the mounting of the hinge on the car.

It should be clear from this description that I have provided an extremely practical form of ball-and-socket hinge for the doors of motor vehicles, and one which can be produced at low cost so as to be competitive with the old style pintle hinges. This hinge lends itself to very easy assembling on doors and pillars of cars as now constructed. With reasonable accuracy in the location of the tapped holes in the plates 38 and 39, the door will fit fairly accurately and operate easily as soon as the hinges are fastened. The offsetting of the ball heads 25 in relation to the shanks 26 permits quick and easy adjustment of the door to center it in its opening and align it with the outside of the body by angular adjustment of the gooseneck portion 27. In the specific construction shown, this would be done by the workman in the assembly line at the automobile factory taking a tool to bend or twist the gooseneck so as to bring the ball 25 on either or both hinges closer to or farther from the door 21 or above or below the normal substantially horizontal plane of the goosenecks, or forwardly or rearwardly from the initial positions thereof, whereby to adjust the door accordingly in the door opening for centering and alignment. The door will swing freely because the ball heads 25 are swiveled in the sockets 28 for universal movement and the adjustment referred to cannot disturb alignment, because each ball head determines a single point suspension, and the two points thus determined by the two hinges on a door establish the hinging axis of the door. In the specific hinge shown, this axis is located in a predetermined spaced relation to the outside of the body so that there is ample clearance between the door and the curved outside of the body to allow the door to open and close freely. Inasmuch as the necessity for accurate alignment has been obviated with the present hinge and the binding effect that went with misaligned pintles is eliminated, wear is greatly reduced and longer life assured. Reduction in wear is further due to the lower unit-bearing pressure obtained with the ball heads as compared with the pintles. Easy operation indefinitely can be assured if a sufficient amount of hard grease is applied to the ball heads 25 at the time the hinges are assembled.

Referring to Fig. 4, the ball head member 24 has its ball head 25 bearing in the socket 28a of the hinge member 23a, wherein a circular recess 40' is provided containing a spring washer 41'. This washer bears on its smaller circumference in the recess and with its larger circumference on the ball head and is compressed sufficiently in the assembling of the ball head in the socket to maintain the head under spring tension throughout the life of the hinge, so as to eliminate play and provide an automatic take-up for wear so that there should never be any noticeable door rattling. The hinge may be otherwise constructed like the one of Figs. 1 to 3.

Referring to Fig. 5, a coiled compression spring 42 is shown inserted in a radial bore 43 provided in the ball head 25b, and a button 44 having a rounded or spheroidal face is held in engagement with the inside wall of the socket 28 under the pressure of this spring to eliminate play between the ball and socket and afford an automatic take-up for wear.

The hinge of Fig. 6 resembles the hinge of Figs. 1 to 3, but is designed to allow for "spring back" of the metal in the forming of the walls to close the socket upon the ball head. In the event it is desired to use sheet metal of such heavy gauge or having such characteristics that the spring back after forming would result in too much play between the ball and socket, I propose forming the ball head in the manner shown in Fig. 6 to avoid this difficulty. The head 25c shown here has a relieved portion 46 which is concentric with respect to the rest of the ball head and bounded by an annular shoulder 47. This relieved portion permits edge portions of the walls 32a in the closing of the socket 28c upon the ball head to be bent inwardly farther than would be permitted if the ball head were a complete, true sphere, and hence when the dies open and the walls 32a spring back the usual amount, the socket 28c is more nearly truly spheroidal and the ball head will accordingly be confined with the desired small amount of working clearance. In passing, it will also be noted that the walls 32a are widened as at 32b to provide top and bottom cover flanges closing the space between the angular end portion 29c and the outside of the body. These cover flanges improve the appearance of the hinge by concealment of the otherwise exposed portion of the other hinge member 24c, and also afford protection for the ball and socket.

It is believed the foregoing description conveys a good understanding of the objects and advantages of my invention. The appended claims have been drawn with a view to covering all legitimate modifications and adaptations.

I claim:

1. A hinge comprising a pair of hinge parts having a universal swivel connection, said parts comprising attaching shanks, one of said hinge parts having a ball projecting therefrom carried on an adjustable angular gooseneck extension disposed in a plane transverse to the related attaching shank the angularity of which extension in relation to the shank determines the operating relationship of the two shanks with respect to one another, and the other of said hinge parts having a socket projecting therefrom open laterally in the direction of the first-named attaching shank and adapted to receive and retain the aforesaid ball with a swivel fit, the gooseneck extension being movable through the socket opening which is of sufficient width to permit adjustment of the gooseneck transversely to the hinging movement of the hinge parts relative to one another, the socket being carried on a hollow angular extension on the other attaching shank, the latter extension being adapted to receive the gooseneck extension therein in a certain position of the hinge parts relative to one another.

2. A hinge comprising a pair of hinge parts having a universal swivel connection, said parts comprising attaching shanks constructed for fastening to substantially parallel vertical surfaces on a door and its supporting pillar, one of said hinge parts having a ball projecting therefrom and carried on an adjustable angular gooseneck extension disposed in a substantially horizontal plane transverse to the related attaching shank the angularity of which extension in relation to the shank determines the operating relationship of the two shanks with respect to one another, and the other of said hinge parts having a socket projecting therefrom open laterally in the direction of the first-named attaching shank and adapted to receive and retain the aforesaid ball with a swivel fit, the gooseneck extension being movable through the socket opening which is of sufficient width to permit adjustment of the gooseneck transversely to the hinging movement of the hinge parts relative to one another, the socket being carried on a hollow angular extension on the other attaching shank, the latter extension being adapted to receive the gooseneck extension therein in a certain position of the hinge parts relative to one another, the gooseneck extension and hollow extension both adapted to extend laterally in the same direction relative to the joint line between the door and pillar.

3. In a hinge, a ball member and a socket member connected in a ball and socket swivel joint, the ball member comprising an attaching shank portion having an angularly adjustable gooseneck thereon in a plane transverse with respect to said shank carrying a ball head on the end thereof in laterally offset relation to the shank portion the angularity of which gooseneck in relation to the shank determines the operating relationship of the two shanks with respect to one another, the socket member comprising a body formed to provide a flat attaching shank portion having a hollow extension of channel shaped cross-section opening into a socket at the outer end thereof in laterally offset relation to the shank portion, said socket being open laterally in the direction of the first-named shank portion and formed to enclose and retain the ball head with freedom for relative angular movement between the socket and gooseneck through a predetermined range, the gooseneck being movable through the socket opening which is of sufficient width to permit adjustment transversely to the hinging movement of the hinge parts relative to one another, and said hollow extension receiving and enclosing the gooseneck in a certain position of the ball member relative to the socket member.

4. In a hinge, a ball member and a socket member connected in a ball and socket swivel joint, the ball member comprising an attaching shank portion having a gooseneck thereon in a substantially horizontal plane carrying a ball head on the end thereof in laterally offset relation to the shank portion, the socket member comprising a one-piece sheet metal body formed to provide an attaching shank portion having a hollow extension also in a substantially horizontal plane of channel shaped cross-section carrying a socket portion on the end thereof in laterally offset relation to the shank portion, the walls of said socket portion being a continuation of the walls of the channel-shaped extension and being formed to retain the ball head with freedom for relative angular movement between the socket and gooseneck in a substantially horizontal plane through a predetermined range, and said hollow extension receiving and enclosing the gooseneck in a certain position of the ball member relative to the socket member.

5. A hinge as set forth in claim 3, wherein said hollow extension on said socket member shank is of tapered form longitudinally, widening away from the socket, whereby to permit changing the angular relationship of the gooseneck extension to the related shank to adjust the position of the ball head correspondingly, while still permitting entry of the gooseneck extension in the hollow extension.

6. A hinge as set forth in claim 4, wherein said hollow extension on said socket member shank is of tapered form longitudinally, widening away from the socket, whereby to permit changing the angular relationship of the gooseneck extension to the related shank to adjust the position of the ball head up or down correspondingly, while still permitting entry of the gooseneck extension in the hollow extension.

7. As an article of manufacture, a sheet metal socket member for a ball and socket hinge comprising a one-piece body formed to provide a flat attaching shank portion and a channel shaped extension integral therewith opening at its outer end into the side of a ball socket portion, the latter being adapted to receive a ball head carried on a shank, the marginal edge portions of the walls of said socket portion being curved inwardly to retain the ball head, and the socket portion and channel-shaped extension opening into the side thereof together being adapted to afford clearance for the aforesaid shank to permit approximately 90° relative movement between the ball head and socket portion.

8. As an article of manufacture, a sheet metal socket member for a ball and socket hinge comprising a one-piece body formed to provide an attaching shank portion and a channel shaped extension integral therewith and terminating in a socket portion, the channel portion being of tapered form longitudinally widening away from the socket portion.

9. As an article of manufacture, a sheet metal socket member for a ball and socket hinge comprising a one-piece body formed to provide a flat attaching shank portion and a channel shaped extension integral therewith and terminating in a socket portion adapted to receive a ball head therein carried on a shank, having enclosing flanges which are a continuation of the side walls of the channel-shaped extension adapted to retain the ball head in the socket portion, said socket portion being open in communication with the end of the channel-shaped extension, whereby the socket portion and channel-shaped extension together are adapted to afford clearance for the aforesaid shank to permit approximately 90° relative movement between the ball head and socket portion.

10. A hinge of the character described comprising a ball head member having an attaching shank and a ball head projecting outwardly therefrom and connected with the shank by a neck portion, and a socket member formed from sheet metal to provide a flat attaching shank portion and an angular portion formed to generally channel-shaped cross-section, the channel-shaped portion having its extremity further conformed so that the trough of the channel and the opposed flanges thereof envelop and retain the ball head and define a socket therefor wherein the ball head is operable with a swivel action.

11. A ball and socket hinge of the character described, comprising shank portions lying in parallel juxtaposed relation in the closed position of the hinge, a ball head on one end of one of said shanks, the other shank being flat and being made from a single piece of sheet metal formed to provide a channel shaped extension opening into a socket portion at one end receiving the aforesaid ball head for universal hinging movement, said socket portion having the marginal edge portions thereof projecting inwardly around the ball head so as to retain the same.

12. A ball and socket hinge of the character described, comprising shank portions lying in parallel juxtaposed relation in the closed position of the hinge, a ball head on one end of one of said shanks, the other shank being made from a single piece of sheet metal formed at one end to provide a socket portion open in the direction of the first shank and adapted to receive said ball head, said socket portion having marginal portions projecting inwardly around the ball head in the socket to retain the same, said head being recessed on one side toward the open side of the socket to provide a substantially spheroidal surface of a reduced radius in relation to the radius of the rest of the ball head.

13. As an article of manufacture, a hinge member comprising an elongated sheet metal body providing a substantially flat shank portion and having the middle and opposed marginal edge portions at one end defining the walls of a socket portion adapted to receive therein the end of an associated hinge member adapted to be connected therewith for hinging movement of the two members relative to one another, and strengthening and stiffening webs connecting the shank and socket portions the same projecting inwardly from the marginal edge portions of the body portion intermediate the shank and socket portions and extending in converging transverse planes from the longitudinal edges of the shank portion and forming continuations of the adjacent walls of the socket portion.

14. A ball and socket hinge of the character described, comprising shank portions lying in parallel juxtaposed relation in the closed position of the hinge, a ball head on one end of one of said shanks, the other shank being flat and being made from a singe piece of sheet metal formed to provide a channel-shaped extension opening into a socket portion at one end receiving the aforesaid ball head for universal hinging movement, said socket portion having a portion projecting inwardly around the ball head so as to retain the same.

SETH B. ATWOOD.

CERTIFICATE OF CORRECTION.

Patent No. 2,200,440.                                May 14, 1940.

SETH B. ATWOOD.

It is hereby certified that error appears in the printed specification of the above numbered patent requiring correction as follows: Page 3, second column, line 30, claim 9, before "having" insert --and the socket portion--; and that the said Letters Patent should be read with this correction therein that the same may conform to the record of the case in the Patent Office.

Signed and sealed this 2nd day of July, A. D. 1940.

Henry Van Arsdale, (Seal)                      Acting Commissioner of Patents.